United States Patent
Kawasaki et al.

(10) Patent No.: US 6,321,975 B1
(45) Date of Patent: Nov. 27, 2001

(54) MANUFACTURING METHOD OF A STRUCTURE BODY

(75) Inventors: Takeshi Kawasaki; Masakuni Ezumi; Yoshihiko Ina, all of Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/584,385

(22) Filed: May 31, 2000

(30) Foreign Application Priority Data

May 31, 1999 (JP) .................................................. 11-151128

(51) Int. Cl.[7] .................................................. B23K 20/12
(52) U.S. Cl. ..................... 228/112.1; 228/114.5; 228/119
(58) Field of Search ............................... 228/112.1, 114.5, 228/114, 119, 2.1, 189, 234.1; 156/73.5

(56) References Cited

U.S. PATENT DOCUMENTS

| | | | |
|---|---|---|---|
| 5,460,317 | * | 10/1995 | Thomas et al. . |
| 5,794,835 | * | 8/1998 | Colligan et al. . |
| 5,862,975 | * | 1/1999 | Childress . |
| 6,045,028 | * | 4/2000 | Martin et al. . |
| 6,050,474 | * | 4/2000 | Aota et al. . |
| 6,070,784 | * | 6/2000 | Holt et al. . |
| 6,193,137 | * | 2/2001 | Ezumi et al. . |

FOREIGN PATENT DOCUMENTS

WO 95/26254 * 10/1995 (WO) .

OTHER PUBLICATIONS

Nippes, Metals handbook: vol. 6 Welding, Brazing, and Soldering, 1983, p. 90–91.*

* cited by examiner

Primary Examiner—Tom Dunn
Assistant Examiner—Jonathan Johnson
(74) Attorney, Agent, or Firm—Antonelli, Terry, Stout & Kraus, LLP

(57) ABSTRACT

When an insertion force of a rotary tool 340 has searched, it is made clearly that the force at the insertion initial time is large and when a friction stir joining is an ordinary operation time, the force becomes small. According, it is preferable to make small the insertion force at the insertion initial time. To members 20, 30 to be subjected to a joining at a position where the friction stir joining starts a hole 50 is opened, and this hole 50 after the rotary tool 340 has inserted, since a move of the rotary tool 340 is made to begin, a lowering of the insertion force can be attained.

19 Claims, 3 Drawing Sheets

MANUFACTURING METHOD OF A STRUCTURE BODY

BACKGROUND OF THE INVENTION

1. Technical Field

The present invention relates to a manufacturing method of a structure body according to a friction stir joining method and, for example, the present invention is suitable for a joining of hollow extruded frame members.

2. Prior Art

A friction stir joining method is a method in which by rotating a round rod (it is called as a rotary tool) which is inserted to a joining portion and moving it along to the joining line, the joining portion is exothermic heated and is softened and solid state fludized and a solid state joining is carried out. The rotary tool comprises a small diameter portion for inserting to the inserting portion and a large diameter portion which positions at an outside. The small diameter portion and the large diameter portion of the rotary tool have the same axis. A boundary between the small diameter portion and the large diameter portion of the rotary tool is inserted slightly to the joining portion. The rotary tool is inclined toward a rear portion against an advancing direction of the joining.

In the friction stir joining, since the rotary tool is inserted to a metal, a large axial insertion force is necessary. In a joining of a hollow extruded frame member, supporting a plate which is orthogonal to a face plate of the hollow extruded frame member is provided integrally and then a bending of the plate according to the insertion force of the friction stir joining can be prevented.

The above stated technique is disclosed in Japanese application patent laid-open publication No. Hei 09-309164 (EP 0797043 A2).

Since friction stir joining is carried out by inserting compulsively the rotary tool to the members to be subjected to the joining, it is necessary to employ a large insertion force. For this reason, it is necessary to burden bearing members of the rotary tool to the large axial insertion force and this invites a high cost in the manufacture of the apparatus.

Further, when the member to be subjected to the joining is a hollow extruded frame member, the inconvenience such face plate bends by the insertion force causes. To prevent this, it is necessary to form thick a thickness of a support plate of the face plate. For this reason, a weight of the hollow extruded frame member becomes large and a weight of the structure body in which the hollow extruded frame members are joined becomes large.

Further, since the two members to be subjected to the joining are combined simply by a temporary fixing welding, according to the insertion of the rotary tool there is an afraid that the temporary fixing welding may be cut down. When the cut down of the temporary fixing welding an interval between the two members to be subjected to the joining changes accordingly it is impossible to carry out a suitable joining.

When the insertion force of the rotary tool is searched, such an insertion force is large during the insertion initial time. When the friction stir joining becomes to an ordinary condition, the insertion force becomes small. This is considered that the immediately after the joining initial time a raise in temperature of the member to be subjected to the joining is not generated.

SUMMARY OF THE INVENTION

An object of the present invention resides in a manufacturing method of a structure body that an insertion force of a rotary tool to make small.

When the insertion force of the rotary tool is searched, it has became clear that such a force is large during the insertion initial time and the friction stir joining becomes to an ordinary operation condition such a force becomes small. As a result, it is necessary to make low the insertion force during the insertion initial time.

Then a hole is provided on the member to be subjected to the joining which positions at the position where the friction stir joining starts, and after the rotary tool is inserted to this hole, the move of the rotary tool (relatively move against the member to be subjected to the joining) starts, accordingly the lowering of the insertion force can be attained.

DESCRIPTION OF THE INVENTION

Figure 1:
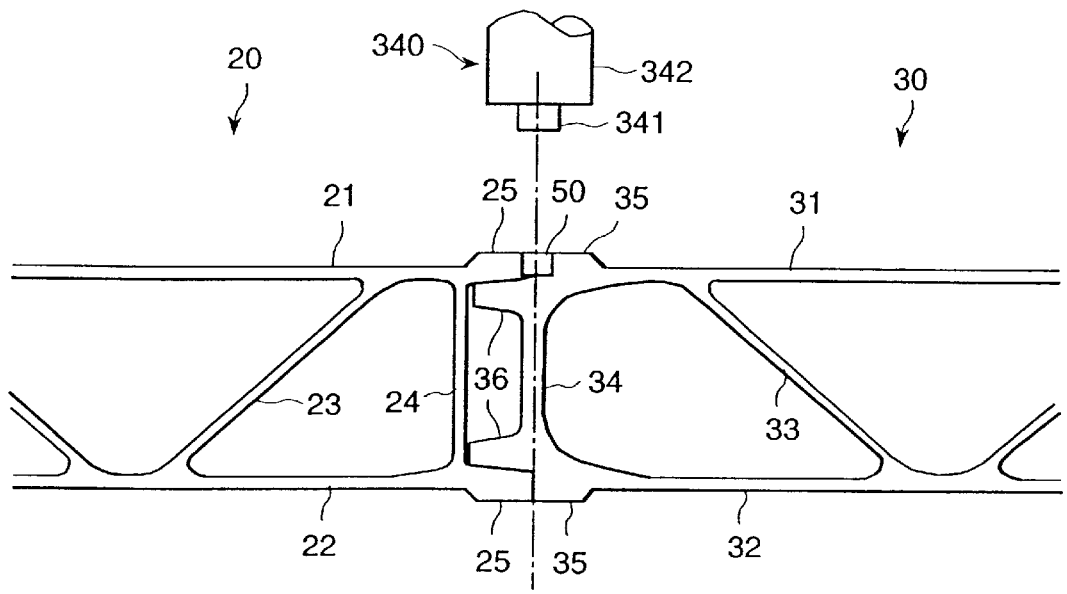
FIG. 1 is a longitudinal cross-section view of a joining portion of one embodiment according to the present invention.
Figure 2:
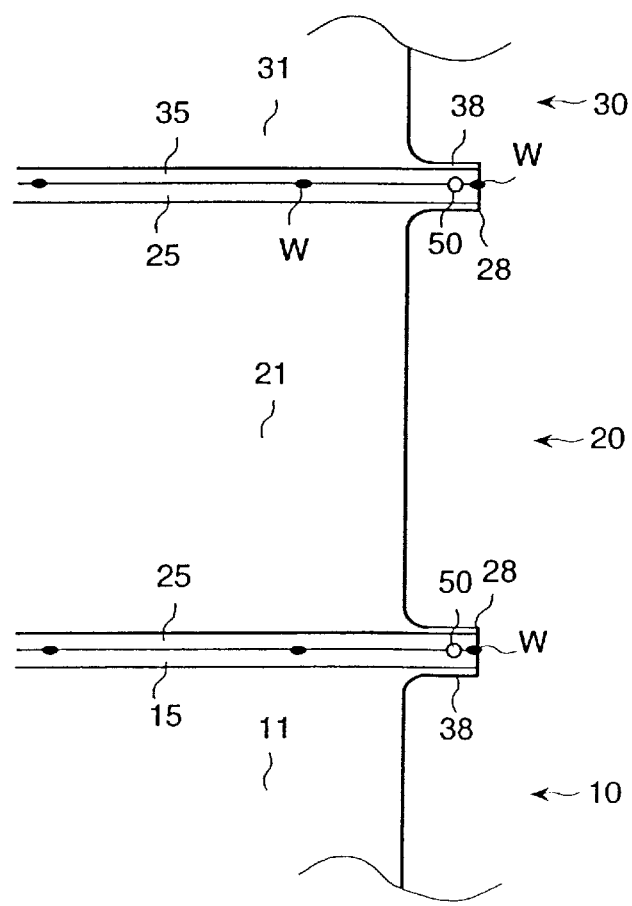
FIG. 2 is a plan view of FIG. 1.

One embodiment according to the present invention will be explained referring to from FIG. 1 to FIG. 5. This is an example of a car vehicle as a structure body. FIG. 2 shows an end portion of a longitudinal direction of a side structure body 201.

A car body is comprised of the side structure body 201, a roof structure body 202 for constituting a roof, a stand frame 203 for constituting a floor, and an end structure body 204 for constituting an end portion of a longitudinal direction. The side structure 201, the roof structure body 202, the stand frame 203 are constituted respectively by joining plural extruded frame members. A longitudinal direction of the extruded frame member is a longitudinal direction of the car body. The extruded frame member is an aluminum alloy made frame member.

The side structure body 201 is comprised of extruded frame members 10, 20, 30, 40. In the extruded frame members 20 and 30, a window 210 is formed. An inlet and outlet port 220 of the side structure body 201 exists in the extruded frame members 10, 20, 30, 40. To the inlet and outlet port 220, after the extruded frame members 10, 20, 30, 40 are joined, in many cases a frame is welded. Similarly to this it is performed to the window 210. The extruded frame members 10, 20, 30 of the inlet and outlet port 220 is cut off in a midway, respectively.

This side structure body 201 is comprised of the four extruded frame members, however in a case of a hollow extruded frame member, it is comprised of further many extruded frame members. Further, the window 210 can be comprised of three extruded frame members. In this case, the central extruded frame member is cut off in a midway.

The construction of the extruded frame member of the side structure body 201 will be explained. Herein, the extruded frame members 20, 30 will be explained. Other frame members 10, 40 will be explained similarly. The extruded frame members 20, 30 are the hollow extruded frame members. The hollow extruded frame members 20, 30 are comprised of two face plates 21, 22 and 31, 32, plural ribs 23 and 33 which connected to the both and are arranged in a truss shape, and support plates 24, 34 for connecting two face plates in an end portion (a joining portion) of a width direction of the hollow extruded frame members.

To the end portions (the joining portion) of the width directions of the face plates 21, 22 and 31, 32, there are raised portions 25 and 35 which are projected toward the outer sides. To the end portion of the width direction of the hollow extruded frame member 30 there are projection chips 36, 36 which are projected toward directing for other hollow extruded frame member 20. The projection chips 36, 36 are inserted between the face plates 21, 22 of the hollow extruded frame member 20. An end portion of the face plates 21, 22 of the hollow extruded frame member 20 is mounted on the projection chips 36, 36. The projection chip 36 forms a seat which supports the insertion force of a rotary tool 340.

A width of the raised portion 25 and a width of the raised portion 35 are the same. An end face of the raised portion 35 which is positioned oppositely the raised portion 25 exists in a width of a plate width of the support plate 34. At a center of the two raised portions 25 and 35 a rotation axial center of the rotary tool 340 of a friction stir joining apparatus 330 is positioned.

Figure 5:
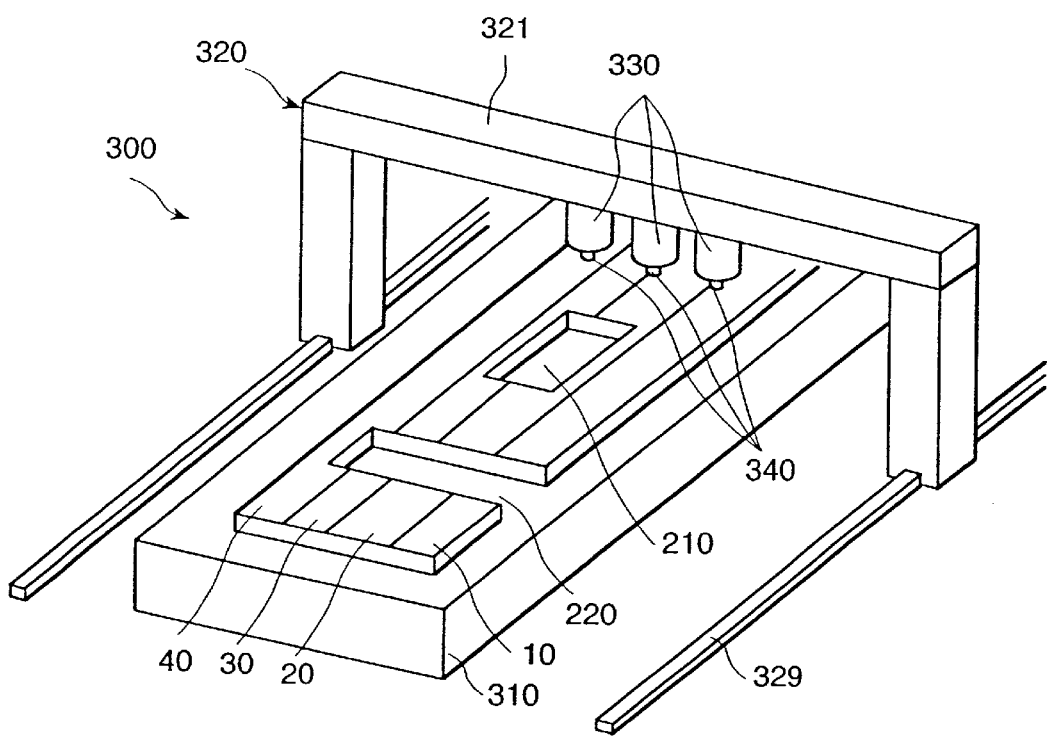
FIG. 5 is a perspective view of a friction stir joining equipment.

As shown in FIG. 5, the extruded frame members 10, 20, 30, 40 for constituting the side structure body 201 are mounted on and fixed to a bed 310 of a direction stir joining equipment 300. A running body 320 runs an upper portion of plural extruded frame members. The running body 320 runs rails 329 of the both side of the bed 310. To a girder 321 of the running body 320 three friction stir joining apparatuses 330 are lifted down. The friction stir joining apparatus 330 lifts down the rotary tool 340 at a lower end. In the respective friction stir joining apparatus 330 it can run along to the girder 321 and it can carry out a lifting-up and a lifting-down of the rotary tool 340 and further it can carry out singly a rotation of the rotary tool 340.

The respective friction stir joining apparatus 330 has respectively an optical sensor. This optical sensor detects a distance from an apex of the raised portions 25 and 35 and determines an insertion amount of the rotary tool at a predetermined value. Further, the above stated sensor detects a width of the two raised portions 25 and 35 and at a center of the width an axial center of the rotary tool 340 is coincided with.

The hollow extruded frame members 20 and 30 are cut off to have the chips 28 and 39 at a start end and a finish end of the joining line. The widths of the chips 28 and 38 have the dimensions in which the support plates 24 and 34 and the raised portions 25 and 35 are provided. The joining is started in the chips 28 and 38 at the start end and the joining is finished in the chips at the finish end. The hollow extruded frame members 10, 20, 30, 40 are cut off to have the window 210 and the inlet and outlet port 220 etc. and to this portions the start end chip 28 and the finish end chip 38 are provided.

The hollow extruded frame members 10, 20, 30, 40 are mounted on the bed 310 and the bed 310 is fixed using a tool. When the fixing has completed, the raised portions 25 and 35 of the abutting portions of the hollow extruded frame members 10, 20, 30, 40 is fixed temporary along to the joining line by means of arc welding manner. The most ends of the start end chip 28 and the finish end chip 38 of the joining line are fixed temporary by means of the arc welding. W indicates the temporary fixing welding. In particular the start end temporary fixing welding W is carried out to the upper faces of the raised portions 25 and 35 and the most end portion faces of the longitudinal direction of the hollow extruded frame members. A region of the most end portion face temporary fixing welding W is between the upper faces of the raised portions 25 and 35 and the projection chip 36. In the temporary fixing welding W, V shape groove is not provided but I shape groove is carried out.

Next, in an inner side (the finish end side) from the temporary fixing welding portion W, to the raised portions 25 and 35 a hole 50 is opened using a handy drill. The hole is provided in the starting end chips 28 and 38. A diameter of the hole 50 is smaller than a diameter of the small diameter portion 341 of the rotary tool 340. A depth of the cut-off hole 50 is shallower than the insertion depth of the rotary tool 340 (the small diameter portion 341 of the rotary tool 340). Namely, the position of the lowest end of the hole 50 is positioned at an upper portion of the lowest end of the small diameter portion 341 of the rotary tool 340. The hole 50 is formed with an intermediate portion between the two raised portions 25 and 35 at an axial center. The hole 50 is orthogonal to the face plats 21 and 31. In general, the axial center of the rotary tool 340 is inclined with about three degree angles. Forming a tip end of the small diameter portion 341 of the rotary tool 340 as a center, the side of the large diameter portion 342 of the rotary tool 340 is a rear side of the advancing direction.

For example, the diameter of the small diameter portion 341 of the rotary tool 340 is 6.0 mm and the insertion depth is 6.0 mm. The diameter of the hole 50 is 4.0 mm and the position of the lowermost end of the hole 50 is 5.0 mm.

Next, the friction stir joining is carried out by rotating the rotary tool 340 and descending it from the upper portion and the rotary tool 340 is inserted to the joining portion. Under in a condition by coinciding the axial center of the rotary tool 340 with the center of the hole 50, then the rotary tool 340 is descended. The insertion depth of the rotary tool 340 is to up in which the tip end of the small diameter portion 341 of the rotary tool 340 reaches to the projection chip 36. The lower end of the large diameter portion 342 of the rotary tool 340 is positioned between the outer faces of the face plates 21 and 31 and the apexes of the raised portions 25 and 35. The small diameter portion 341 of the rotary tool 340 is a screw member.

After the rotary tool 340 has inserted to the predetermined depth, the rotary tool 340 is moved along to the joining line. An ordinary operation joining is started.

Explaining in detail, at the condition where the axial center of the rotary tool 340 is coincided substantially to the center of the hole 50, by rotating the rotary tool 340 the rotary tool 340 is descended. At first, the small diameter portion 341 of the rotary tool 340 is contacted to the hollow extruded frame members 20, 30, next the large diameter portion 342 of the rotary tool 340 is contacted to the hollow extruded frame members 20, 30. After the rotary tool 340 has inserted to the predetermined depth, the rotary tool 340 is moved along to the joining line. With this, the friction stir joining starts.

The hole 50 is buried with the raised portions 25 and 35 as an original source. When the hole 50 is not buried completely, accompanying with the move of the rotary tool 340 the hole 50 is buried and then a suitable joining condition can be obtained. After the friction stir joining, the chips 28, 29 are cut off. The lengths of the chips 28 and 38 are set to the suitable lengths for carrying out the friction stir joining within the chips 28 and 38.

Since the diameter of the hole 50 is smaller than the diameter of the small diameter portion 341 of the rotary tool 340, the joining is started from the position of the hole 50 and then the lengths of the chips 28 and 38 can be shorten.

Since the lower end (the tip end) of the small diameter portion 341 of the rotary tool 340 is inserted deeply to the lower end (the tip end) of the hole 50, by the existence of the hole 50, no defects can occur to the lower end of the hole 50.

Figure 3:
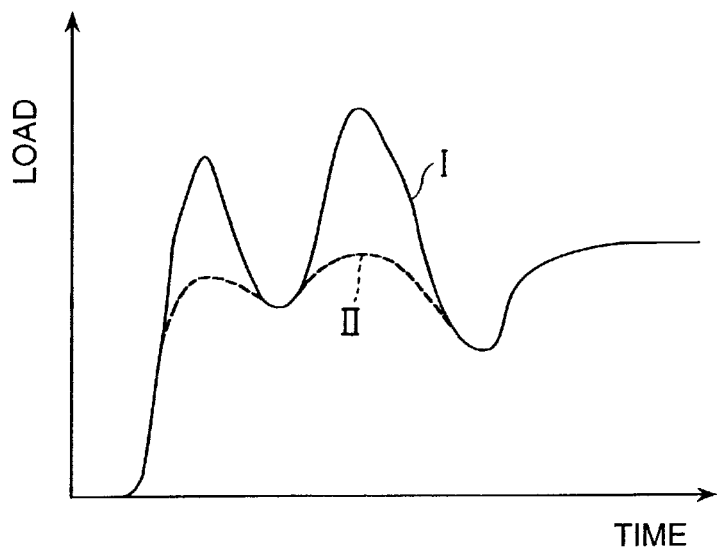
FIG. 3 is an explanatory view of an insertion force oil a friction stir joining.
Figure 4:
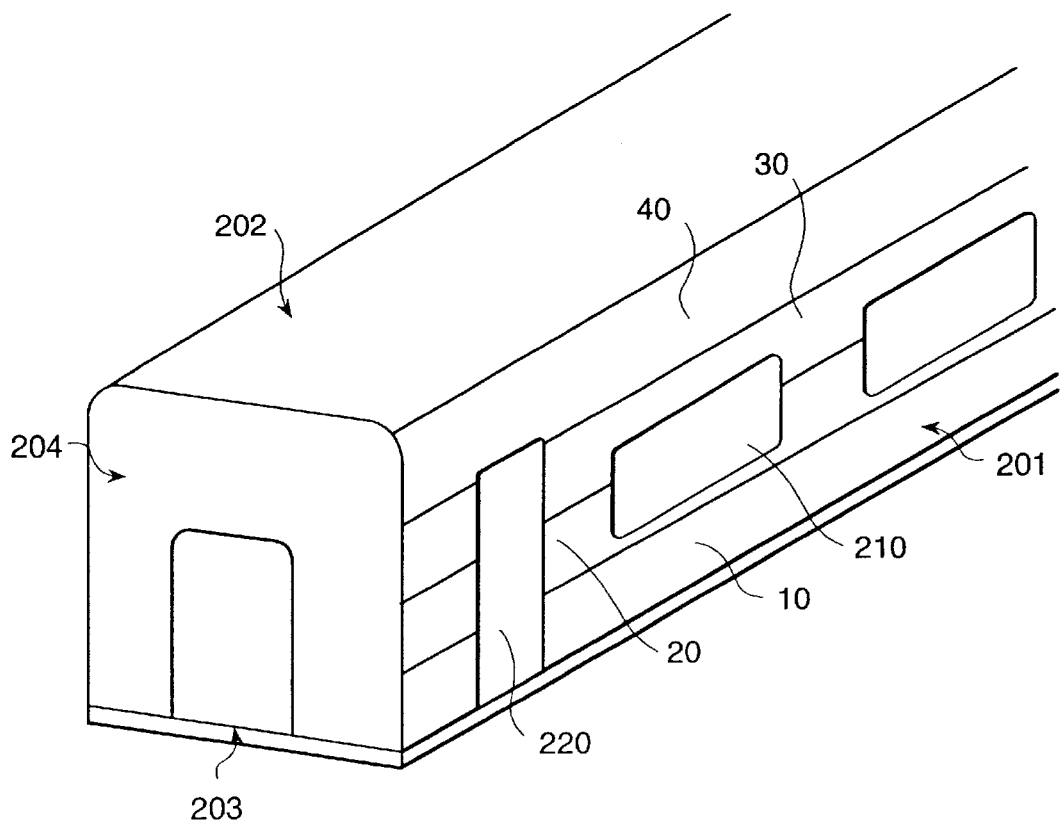
FIG. 4 is a perspective view of a car body of a railway vehicle.

FIG. 3 shows schematically a change of the insertion force. I is a case of no hole and II is a case of the provision of the hole. The insertion force changes largely immediately after the insertion of the rotary tool 340. The change of the insertion force will be explained as following. At first, since the small diameter portion 341 of the rotary tool 340 is inserted into a metal having a solid and a low temperature, the insertion force is arisen accompanying with the insertion. After that, accompanying with the insertion, since the metal is softened, accordingly the insertion force lowers. After that, since the large diameter portion 342 of the rotary tool 340 is inserted and is contacted to a new portion, the insertion force is arisen. After that, accompanying with the insertion, since the metal is softened, accordingly the insertion force lowers. After that, the move of the rotary tool 340 is started, the insertion force is arisen again and the insertion force is fallen to a constant value. When the large diameter portion 342 of the rotary tool 340 is inserted, the temperature at a vicinity of the joining portion is raised, the insertion force does not become large in comparison with a rate of the area of the large diameter portion 342 of the rotary tool 340.

In the present invention, since the small diameter portion 341 of the rotary tool 340 is inserted, as shown in II, the insertion force lowers. The maximum value of the insertion force lowers. As a result, the bearing members of the rotary tool 340 can be formed with a compact shape and at a low cost. Further, the plate thickness of the support plates 24 and 34 can be formed thin. Further, the thickness of the projection chip 36 and the thickness of the connection portion between the projection chip 36 and the support plate 34 can be formed thin. As a result, the structure body can be formed with a light weight structure.

Further, even the maximum value of the insertion force does not lower, the force for making wide the gap of the joining portion between the hollow extruded frame members 20, 30 can be made smaller that that in comparison with the prior art, because of the existence of the hole 50. For this reason, the length and the depth of the temperate fixing welding W at the end portions of the chips 28 and 38 can be formed small and then the welding can be carried out easily. Further, the above stated temporary fixing welding W can be substituted with one in which the chips 28 and 38 are clamped mechanically.

When the joining of the faces of the face plates 21 and 31 has finished, the hollow extruded frame members 20, 30 are reversed, similar to the above the temporary fixing welding and the hole opening are carried out, and then the friction stir joining is carried out. Finally, the chips 28 and 38 are cut off.

The hollow extruded frame members 20, 30 have the window 210. After the cut-off of the hollow extruded frame members 20, 30 with the window shape, when the friction stir joining is carried out, the chips 28 and 38 are provided to the window 210. These chips 28 and 38 are provided on the start ends of the joining. To these chips 28 and 38 the hole 50 is provided and after the temporary fixing joining, then the friction stir joining is carried out.

The shape of the hole 50 may be formed with a taper shape. Further, on the upper end of the hole 50 into which the small diameter portion 341 of the rotary tool 340 is inserted, a hole having a large diameter can be provided. The diameter of the hole 50 of the large diameter portion is smaller than the diameter of the large diameter portion 342 of the rotary tool 340. Further, the hole 50 may provide only to the diameter portion. Further, plural holes 50 having the small diameter may provide.

In the above stated embodiment according to the present invention, the support plate is formed orthogonal with the face plates 31, 32, however when the support plate 34 is supported by the insertion force, the support plate 34 may be formed slant. The shape of the support plate is without distinction of.

The technical range of the present invention is not limited to the wordings stated on each claim of claims or the wordings stated on the item of the means for solving the problem and further it refers to the range in which the man belonged to this technical field can replace easily.

According to the present invention, the insertion force of the rotary tool 340 can be made small and the good friction stir joining can be carried out.

What is claimed is:

1. A method of manufacturing a structural body, comprising the steps of:

starting a friction stir welding by inserting a rotary tool in a preformed hole having been formed by drilling which is provided at a starting portion of a welding line between two members; and next, moving said rotary tool along said welding line.

2. A manufacturing method according to claim 1, characterized in that after said two members are mounted on a bed, at an abutting portion of said two members, said hole is formed by a drilling device.

3. A manufacturing method according to claim 1, characterized in that using a rotary tool having a portion with a diameter larger than the diameter of said hole, the friction stir welding is carried out.

4. A manufacturing method according to claim 1, characterized in that using a rotary tool having a small diameter portion larger than the diameter of said hole, the friction stir welding is carried out.

5. A manufacturing method according to claim 1, characterized in that a tip end of said rotary tool is inserted deeply to a predetermined depth in said hole.

6. A method of manufacturing a structural body, comprising the steps of:

fixing abutting two members to a bed;

welding a starting end side of a welding line of said two members and welding the other end side from the starting end side;

on said welding line at the starting end side, forming a hole in an insertion direction of a rotary tool by drilling;

inserting the rotary tool into said hole at the starting end side while rotating said rotary tool and starting a friction stir welding; and moving said rotary tool along said welding line.

7. A method of manufacturing a structural body by welding members using friction stir welding, comprising the steps of:

fixing abutting two hollow frame members to a bed;

welding a starting end side of a welding line of said two hollow frame members and welding the other end side from the starting end side;

on said welding line at the starting end side, forming a hole in an insertion direction of a rotary tool by drilling;

inserting the rotary tool in said hole at the starting end side while rotating said rotary tool and starting friction stir welding; and moving said rotary tool along said welding line.

8. A manufacturing method according to claim 1, wherein the rotary tool has a small diameter portion and a larger diameter portion than the small diameter portion, and wherein the hole has a diameter which is smaller than the small diameter portion of the rotary tool.

9. A manufacturing method according to claim 1, wherein the hole has a depth that is shallower than a depth that the rotary tool is inserted.

10. A manufacturing method according to claim 1, wherein an axis of the hole coincides with an axis of the rotary tool when inserting the rotary tool.

11. A manufacturing method according to claim 1, wherein said hole has a taper shape.

12. A manufacturing method according to claim 1, wherein the hole has a first portion, at an upper end of the hole, having a relatively large diameter, and a second portion, extending from the first portion, having a smaller diameter.

13. A manufacturing method according to claim 1, wherein the two members form a major edge orthogonal to the welding line between the two members and form a chip extending beyond the major edge and including the welding line, and wherein the hole is provided in the chip.

14. A manufacturing method according to claim 13, wherein the chip is cut off after finishing the friction stir welding.

15. A manufacturing method according to claim 1, wherein the two members are hollow members, each member including two plates and ribs extending therebetween.

16. A manufacturing method according to claim 15, wherein a support rib is provided for one of the two members extending orthogonally between the two plates of said one of the two members, said support rib extending beneath said hole.

17. A manufacturing method according to claim 1, wherein the two members form a raised portion, protruding from a main surface of the two members toward the rotary tool, and wherein the hole is provided in the raised portion.

18. A manufacturing method according to claim 6, wherein the two members form a raised portion, protruding from a main surface of the two members toward the rotary tool, and wherein the hole is provided in the raised portion.

19. A manufacturing method according to claim 6, wherein the two members form a raised portion, protruding from a main surface of the two members toward the rotary tool, and wherein the hole is provided in the raised portion.

* * * * *